(12) United States Patent
Mathada et al.

(10) Patent No.: US 11,187,551 B2
(45) Date of Patent: Nov. 30, 2021

(54) METHODS AND SYSTEMS FOR RECOMMENDING ACTIVITIES TO USERS ONBOARD VEHICLES

(71) Applicant: INTERNATIONAL BUSINESS MACHINES CORPORATION, Armonk, NY (US)

(72) Inventors: Prasanna Alur Mathada, Bangalore (IN); Shwetha Gopalakrishna, Banagalore (IN); Sudhakar T. Seshagiri, Bangalore (IN); Shruthi Ravindra, Bangalore (IN); Michal Kmak, Cracow (PL)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 122 days.

(21) Appl. No.: 16/814,503

(22) Filed: Mar. 10, 2020

(65) Prior Publication Data

US 2021/0285784 A1 Sep. 16, 2021

(51) Int. Cl.
*G01C 21/36* (2006.01)
*G06K 9/00* (2006.01)

(52) U.S. Cl.
CPC ..... *G01C 21/3617* (2013.01); *G01C 21/3697* (2013.01); *G06K 9/00677* (2013.01); *G06K 9/00832* (2013.01)

(58) Field of Classification Search
CPC ........... G01C 21/3617; G01C 21/3697; G06K 9/00677; G06K 9/00832
See application file for complete search history.

(56) References Cited

U.S. PATENT DOCUMENTS

| | | | |
|---|---|---|---|
| 9,296,396 B2 | 3/2016 | Gluck et al. | |
| 9,516,470 B1* | 12/2016 | Scofield | H04W 4/029 |
| 9,651,391 B1* | 5/2017 | Hayes | G06Q 50/01 |
| 2013/0336538 A1* | 12/2013 | Skaff | G06K 9/00832 382/104 |
| 2017/0015318 A1* | 1/2017 | Scofield | G06Q 30/0283 |
| 2017/0370741 A1 | 12/2017 | Swaminathan et al. | |
| 2018/0156621 A1* | 6/2018 | Suzuki | G06Q 10/02 |
| 2019/0050475 A1* | 2/2019 | Tullimalli | G05D 1/021 |
| 2019/0052701 A1 | 2/2019 | Rathod | |

FOREIGN PATENT DOCUMENTS

CN 107749020 A 3/2018

\* cited by examiner

*Primary Examiner* — Mohamed Barakat
(74) *Attorney, Agent, or Firm* — Griffiths & Seaton PLLC

(57) ABSTRACT

Embodiments for generating recommendations for user activity onboard a vehicle are provided. A first user and a second user onboard a vehicle are identified. A relationship between the first user and the second user is determined based on at least one information source associated with at least one of the first user and the second user. A traffic condition associated with the vehicle traveling to a destination is detected. A recommendation of an joint activity for the first user and the second user while onboard the vehicle is generated based on the determined relationship between the first user and the second user, the detected traffic condition, and the at least one information source.

21 Claims, 8 Drawing Sheets

METHODS AND SYSTEMS FOR RECOMMENDING ACTIVITIES TO USERS ONBOARD VEHICLES

BACKGROUND OF THE INVENTION

Field of the Invention

The present invention relates in general to computing systems, and more particularly, to various embodiments for generating activity recommendations for users onboard vehicles.

Description of the Related Art

As users' connectivity to computing devices (e.g., mobile electronic devices, wearable devices, vehicular computing systems, etc.) increases, there is an ever growing opportunity for the users to interact with the devices and/or communicate with other individuals. For example, when being transported in a vehicle (e.g., an automobile), some of the individuals in the vehicle may have an opportunity to utilize one or more devices under certain circumstances, such as when experiencing traffic congestion.

When such occurs, the time to travel to the destination may be considerably longer than originally expected and/or there may be time when the vehicle moves very little, if at all, over the course of a significant amount of time (e.g., 20 minutes, etc.). During such times, users may, for example, become bored, experience increased stress levels, and miss opportunities to be productive.

SUMMARY OF THE INVENTION

Various embodiments for generating recommendations for user activity onboard a vehicle, by a processor, are provided. A first user and a second user onboard a vehicle are identified. A relationship between the first user and the second user is determined based on at least one information source associated with at least one of the first user and the second user. A traffic condition associated with the vehicle traveling to a destination is detected. A recommendation of an joint activity for the first user and the second user while onboard the vehicle is generated based on the determined relationship between the first user and the second user, the detected traffic condition, and the at least one information source.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
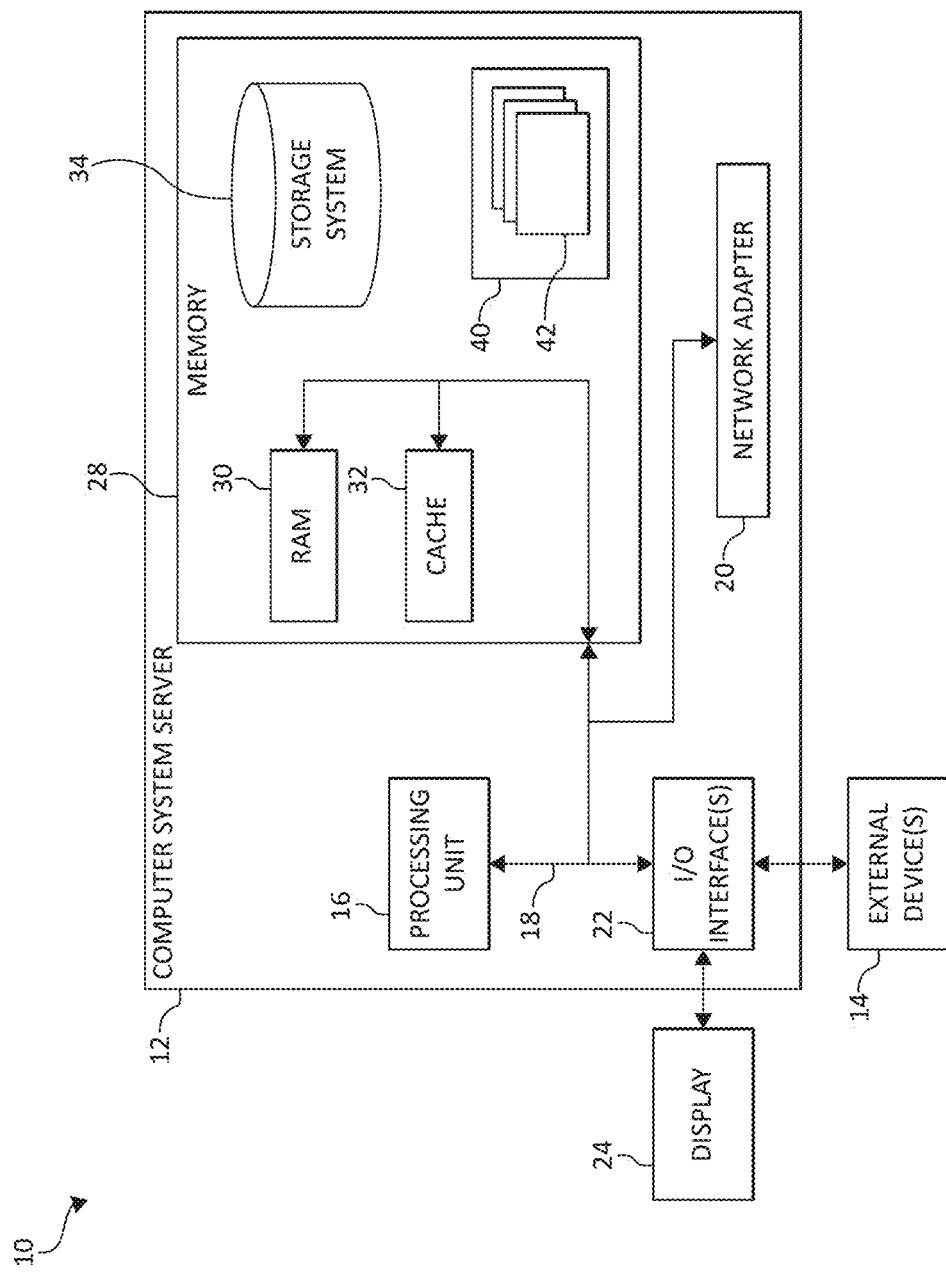
FIG. 1 is a block diagram depicting an exemplary computing node according to an embodiment of the present invention.

As discussed above, as users' connectivity to computing devices (e.g., mobile electronic devices, wearable devices, vehicular computing systems, etc.) increases, there is an ever growing opportunity for the users to interact with the devices and/or communicate with other individuals. For example, when being transported in a vehicle (e.g., an automobile), some of the individuals in the vehicle may have an opportunity to utilize one or more devices under certain circumstances, such as when experiencing traffic congestion.

When such occurs, the time to travel to the destination may be considerably longer than originally expected and/or there may be time when the vehicle moves very little, if at all, over the course of a significant amount of time (e.g., 20 minutes, etc.). During such times, users may, for example, become bored, experience increased stress levels, and miss opportunities to be productive.

Some current systems applicable to such situations engage a user in a conversational dialog associated with vehicle-related topics, such as those commonly found in a vehicle owner's manual. Such systems may include modules to interpret spoken natural language input, search a vehicle knowledge base and/or other data sources for pertinent information, and respond to the user's input in a conversational fashion. The dialog may be initiated by the user or more proactively by the vehicle personal assistant based on events that may occur in relation to the vehicle. Real-time inputs obtained from the vehicle and/or non-verbal inputs from the user may be utilized to enhance understanding of the dialog and assist the user in a variety of ways.

Although such systems may provide information about vehicle and components associated with vehicle, the systems do not provide recommendations to any users (or individuals) in the vehicle with respect to activities that may be performed, given a particular amount of time. Such systems also do not take into consideration multiple individuals within the vehicle, and involves two-way vocal interaction between the vehicle assistant and the person driving the vehicle when the vehicle is in motion or stationary. Further, such systems do not take into account the point of origin or destination, and thus do not provide any recommendations with respect to what user activities should be prioritized given the amount of time until the vehicle reaches the destination.

Other current systems provide hands-free reading of content. For example, data items are identified for presentation to a user, which are associated with a domain-specific item type. The items are sorted according to a particular order, based on the domain-specific item type. A speech-based overview of the plurality of data items is generated. For each of the data items, a respective speech-based, item-specific paraphrase is generated based on the respective content of the data item. Such are provided to the user through a speech-enabled dialogue interface.

Such systems provide a speech-enabled dialogue interface in which based on the domain-specific item type a speech-based overview of the plurality of data items is generated. As such, the systems may read out emails, messages, item list, reminders, etc. It applies to a context, free of motion or at rest. These systems do not take point or origin or destination into account, and thus do not provide any recommendations to any users in the vehicle with respect to activities that may be performed, given a particular amount of time.

To address these needs and/or the shortcomings in the prior art, in some embodiments described herein, methods and/or systems are disclosed that generate recommendations for user activity (or activities, tasks, etc.) and provides such to the user(s) when within a vehicle (e.g., by displaying the recommendations on a display device, aural indications utilizing a speaker, etc.). It should be understood that although some embodiments described herein reference the user(s) being in an automobile, the methods and systems described herein may be applied to other types of vehicles, such as aircraft, watercraft, and other ground vehicles (e.g., trains).

As a general example, consider a scenario in which multiple users (or individuals) are in an automobile that is traveling to a particular destination, which has been input into a navigation or mapping system (e.g., accessible/in operable communication with a system such as that described herein). At least one computing device onboard the vehicle (e.g., a vehicular computing system or a computing system integrated into a vehicle, a mobile electronic device, etc.) is equipped with the system(s) and/or method(s) described herein. The system detects the presence of the users onboard the vehicle. This may be performed utilizing, for example, one or more cameras (or other sensors), which may be integrated with the vehicle or installed on a mobile electronic device, utilizing facial recognition. Alternatively, the presence of the users may be determined based on the detected presence of mobile electronic devices (e.g., performed via wireless communications).

With the users detected (and/or identified), the system determines (or attempts to determine) one or more relationship between the users. This may be performed by analyzing various information sources associated with the users, such as contact lists (e.g., on mobile device, associated with email accounts, etc.), social media information and activity, communications (e.g., emails, text messages, etc.), and any other information sources accessible by the system (such as the other information sources described herein).

The systems receives (and/or monitors) traffic conditions (e.g., via the navigation/mapping system, online channels, etc.) while the vehicle is en route to the destination (though this process may be initiated before the vehicle begins to move). If a particular traffic condition(s) are detected, the system may generate one or more activity recommendations for one or more of the users onboard the vehicle. For example, in some embodiments, if the system determines that if will take more than a predetermined amount of time to arrive at the destination and/or the vehicle stops moving (or moves less than a predetermined distance within a particular amount of time or is expected to do so) due to, for example, traffic congestion, roadway construction, etc., such circumstances may initiate the generation of activity recommendations described herein. Recommendations (e.g., a single recommend activity or a list of recommended activities) may be provided to the user(s) utilizing any computing device(s) within the vehicle, such as vehicular computing systems, mobile electronic devices, etc. via a display device (i.e., visual indications) or speakers (i.e., aural indications).

In some embodiments, the recommendations are generated based on any determined relationships between the users onboard the vehicle, the traffic condition(s) (e.g., the expected delay), and/or any available information source associated with the users (e.g., the same sources described above). As such, in some embodiments, utilizing the determined relationships, the generated activity recommendations are associated with (or are intended for) more than one user in the vehicle (i.e., a joint activity for the user(s)). In other words, in some embodiments, activity recommendations are generated and/or prioritized in such a way that the activities are applicable to more than one user in the vehicle (e.g., a driver of an automobile and one or more passenger in the vehicle). However, in some embodiments, when there is only one user in the vehicle (e.g., the driver of an automobile), the system may customize the recommendation only for that user. Additionally, in some embodiments, the destination of the vehicle is taken into account when generating the activity recommendations.

For example, if the system determines that two or more of the users in the vehicle are co-workers, and the destination is the workplace of the users, the system may recommend a joint work-related activity. As a specific example, if the system determines that two of the users may desire to contact a particular individual (e.g., a manager, an employee of another company, etc.) based on communications, "to-do" lists, calendars, etc., the system may recommend that the users call the individual while they are in the vehicle (or at least include such in a list of activity recommendations). In contrast, if the system determines that two of the users in the vehicle are children, a brother and sister, while one of their parents is driving, and the destination is their home, an activity recommendation may include the two children watching a video, listening to music, playing a game, etc. However, if the destination is children's school, the system may recommend different activities, such as studying for a test (which may be identified utilizing various information sources associated with the children) or reading educational material.

In some embodiments, the activity recommendations are based on the estimated amount of time available (e.g., before the vehicle begins moving and/or before the vehicle reaches the destination) along with the expect time to complete the activities (or tasks). Additionally, in some embodiments, the system utilizes "mood detection" techniques (e.g., via a camera, biometric sensor, etc.) to determine the state of mind (or stress level, etc.) of the user. This information may also be utilized to generate the activity recommendations (e.g., the system may not recommend making an important, work-related telephone call based on the user's mood).

As such, in some embodiments, the presence of one or more users (or individuals) within (or onboard) a vehicle is detected. In embodiments in which more than one user is present in the vehicle, the system determines a relationship between at least two of the user (if possible). A traffic condition associated with the vehicle traveling (from a point of origin or starting point) to a destination is detected. Based on the relationship(s) (if more than one user), the traffic condition(s), and various information sources associated with the user(s), a recommendation with respect to an activity (or activities) for the user(s) to partake in or perform while in the vehicle is generated.

In some embodiments, the system evaluates the users within the vehicle and their relationship with the other users in the vehicle. Such a process may essentially include constructing a relationship tree, which may be utilized to prioritize generated recommendations. Recommendations may be provided to the user(s) utilizing one or more computing device onboard the vehicle (e.g., a vehicular computing system, a mobile electronic device, etc.). In some embodiments, recommendations are only generated and/or provided to the user(s) when the vehicle is stationary (or at least is moving/has moved less than a predetermined distance within a particular amount of time or is expected to do so based on traffic conditions).

In some embodiments, the recommendation(s) is provided to the user(s) utilizing a "dashboard" that is rendered on a display screen of a computing device (e.g., a vehicular computing system, a mobile electronic device, etc.). In some embodiments, the system specifically tailors the recommendations to the users based on the available information sources associated with the user(s) (and/or the traffic condition(s)), any relationships between the users, and/or any available information associated with the user(s).

It should be understood that at least some of the aspects of functionality described herein may be performed utilizing a cognitive analysis. The cognitive analysis may include natural language processing (NLP) and/or natural language understanding (NLU) or NLP/NLU technique, such classifying natural language, analyzing tone, and analyzing sentiment (e.g., scanning for keywords, key phrases, etc.) with respect to, for example, content and communications sent to and/or received by users or entities and/or other available data sources. In some embodiments, Mel-frequency cepstral coefficients (MFCCs) (e.g., for audio content), and/or region-based convolutional neural network (R-CNN) pixel mapping (e.g., for object detection/classification and facial recognition in images/videos), as are commonly understood, are used.

The processes described herein may utilize various information or data sources associated with users and/or entities and/or the content of communications. The data sources may include any available information (or data) sources associated with the user and/or entities. For example, in some embodiments, a profile (e.g., a cognitive profile) for the user(s) (and/or entities) may be generated. Data sources that may be use used to generate cognitive profiles may include any appropriate data sources associated with the user/entity that are accessible by the system (perhaps with the permission or authorization of the user/entity). Examples of such data sources include, but are not limited to, communication sessions and/or the content (or communications) thereof (e.g., phone calls, video calls, text messaging, emails, in person/face-to-face conversations, etc.), a profile of (or basic information about) the user/entity (e.g., demographic information, job title, place of work, length of time at current position, family role, etc.), a schedule or calendar (i.e., the items listed thereon, time frames, etc.), projects (e.g., past, current, or future work-related projects, "to-do" lists, etc.), location (e.g., previous and/or current location and/or location relative to other users), social media activity (e.g., posts, reactions, comments, groups, etc.), browsing history (e.g., web pages visited), and online purchases. The cognitive profile(s) may be utilized to, for example, evaluate remote services/providers and/or information sources.

As such, in some embodiments, the methods and/or systems described herein may utilize a "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, recommending activities, as described herein. Utilizing the models, the performance (or operation) of the system (e.g., utilizing/based on new inputs) may be predicted and/or the performance of the system may be optimized by investigating how changes in the input(s) effect the output(s). Feedback received from (or provided by) users and/or administrators may also be utilized, which may allow for the performance of the system to further improve with continued use.

It should be understood that as used herein, the term "computing node" (or simply "node") may refer to a computing device, such as a mobile electronic device, desktop computer, etc. and/or an application, such a chatbot, an email application, a social media application, a web browser, etc. In other words, as used herein, examples of computing nodes include, for example, computing devices such as mobile phones, tablet devices, desktop computers, or other devices, such as appliances (IoT appliances) that are owned and/or otherwise associated with individuals (or users), and/or various applications that are utilized by the individuals on such computing devices.

In particular, in some embodiments, a method for generating recommendations for user activity onboard a vehicle, by a processor, is provided. A first user and a second user onboard a vehicle are identified. A relationship between the first user and the second user is determined based on at least one information source associated with at least one of the first user and the second user. A traffic condition associated with the vehicle traveling to a destination is detected. A recommendation of an joint activity for the first user and the second user while onboard the vehicle is generated based on the determined relationship between the first user and the second user, the detected traffic condition, and the at least one information source The detected traffic condition associated with the vehicle traveling to the destination may include at least one of an estimated time for the vehicle to arrive at the destination and predicted movements of the vehicle as the vehicle travels to the destination. The at least one information source may include at least one of sensor information, a contact list, a schedule, and social media information.

At least one of the identifying of the first user and the second user and the determining of the relationship between the first user and the second user may be performed utilizing at least one of a camera and the presence of computing devices onboard the vehicle. The generating of the recommendation of the joint activity for the first user and the second user may include generating a list of a plurality of recommended joint activities for the first user and the second user and providing the list of the plurality of recommended joint activities utilizing a computing device onboard the vehicle.

If the destination is a first destination, the recommended joint activity may include a first joint activity. If the destination is a second destination, the recommended joint activity may include a second joint activity.

A third user onboard the vehicle may be identified. A relationship between the third user and at least one of first user and the second user may be determined. A recommendation of an activity for the third user may be generated based on the detected traffic condition, the determined relationship between the third user and the at least one of the first user and the second user, and at least one information source associated with the third user. The recommended activity for the third user may be different than the recommended joint activity for the first user and the second user.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in (and/or integrated into) vehicles, such as automobiles, aircraft, watercrafts, etc. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
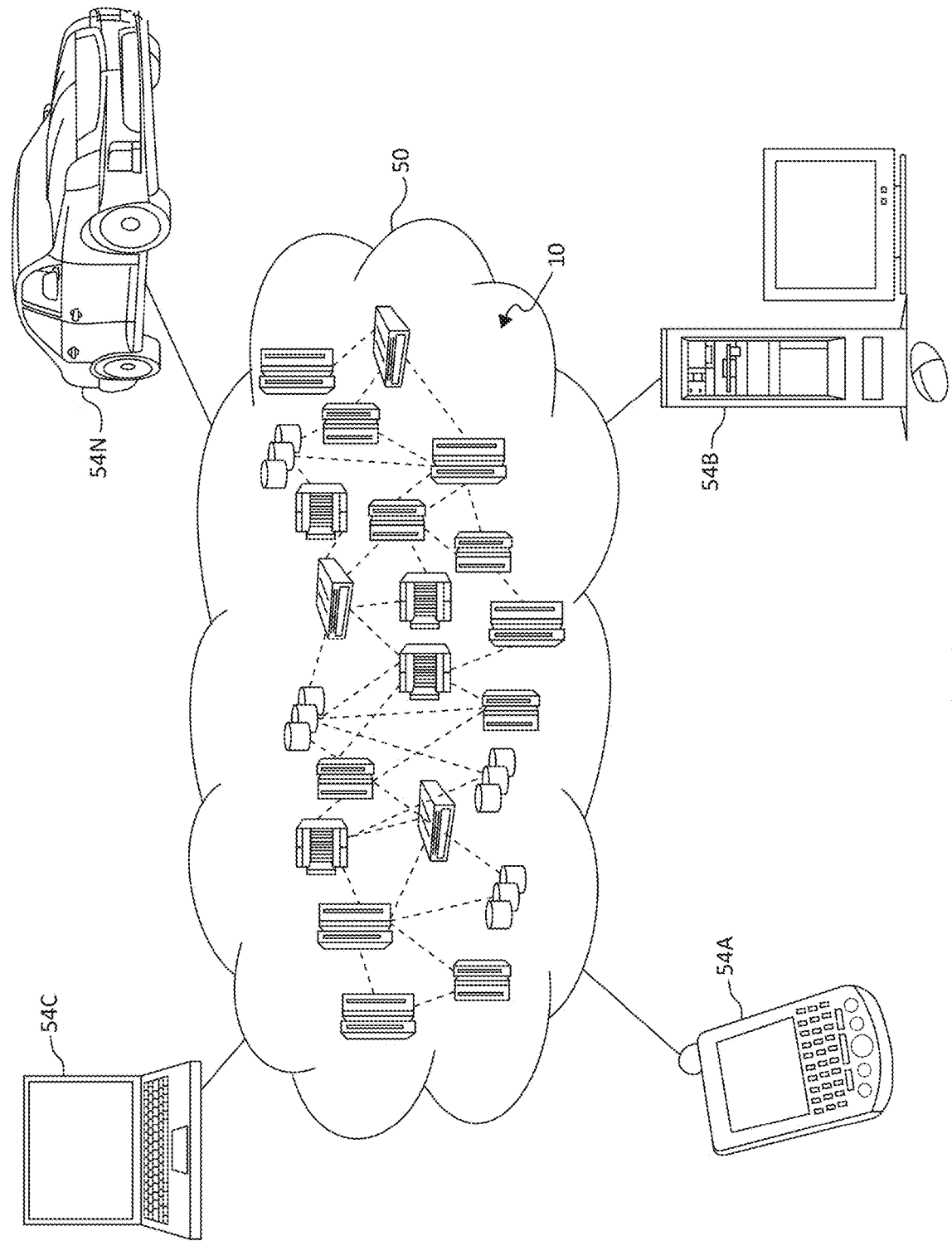
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and vehicular computing system (e.g., integrated within automobiles, aircraft, watercraft, etc.) 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
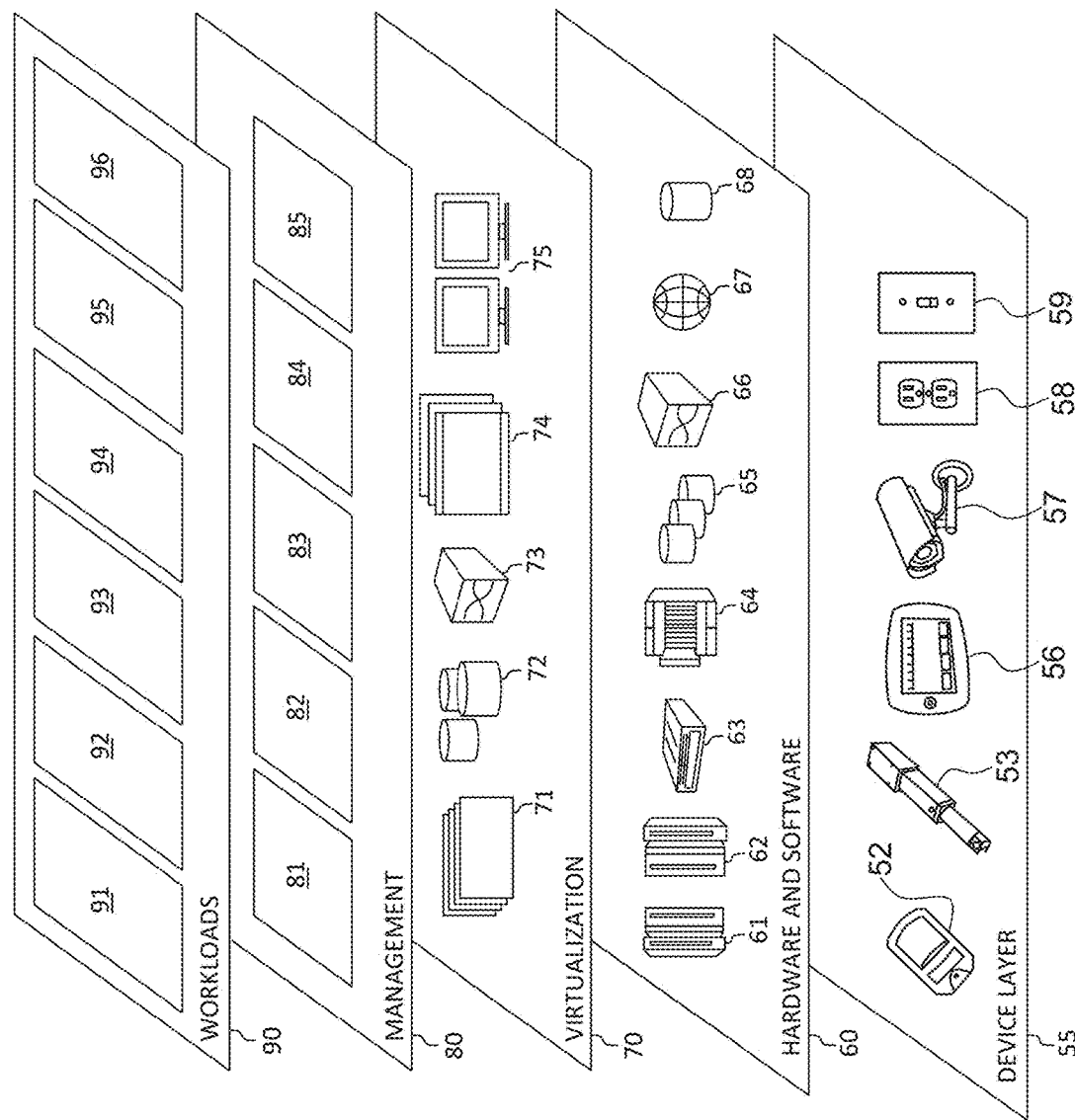
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator, washer/dryer, or air conditioning unit, and a wide variety of other possible interconnected devices/objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for recommending activities, as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, in some embodiments, the presence of one or more users (or individuals) within (or onboard) a vehicle is detected. In embodiments in which more than one user is present in the vehicle, the system determines a relationship between at least two of the user (if possible). A traffic condition associated with the vehicle traveling (from a point of origin or starting point) to a destination is detected. Based on the relationship(s) (if more than one user), the traffic condition(s), and various information sources associated with the user(s), a recommendation with respect to an activity (or activities) for the user(s) to partake in or perform while in the vehicle is generated.

Figure 4:
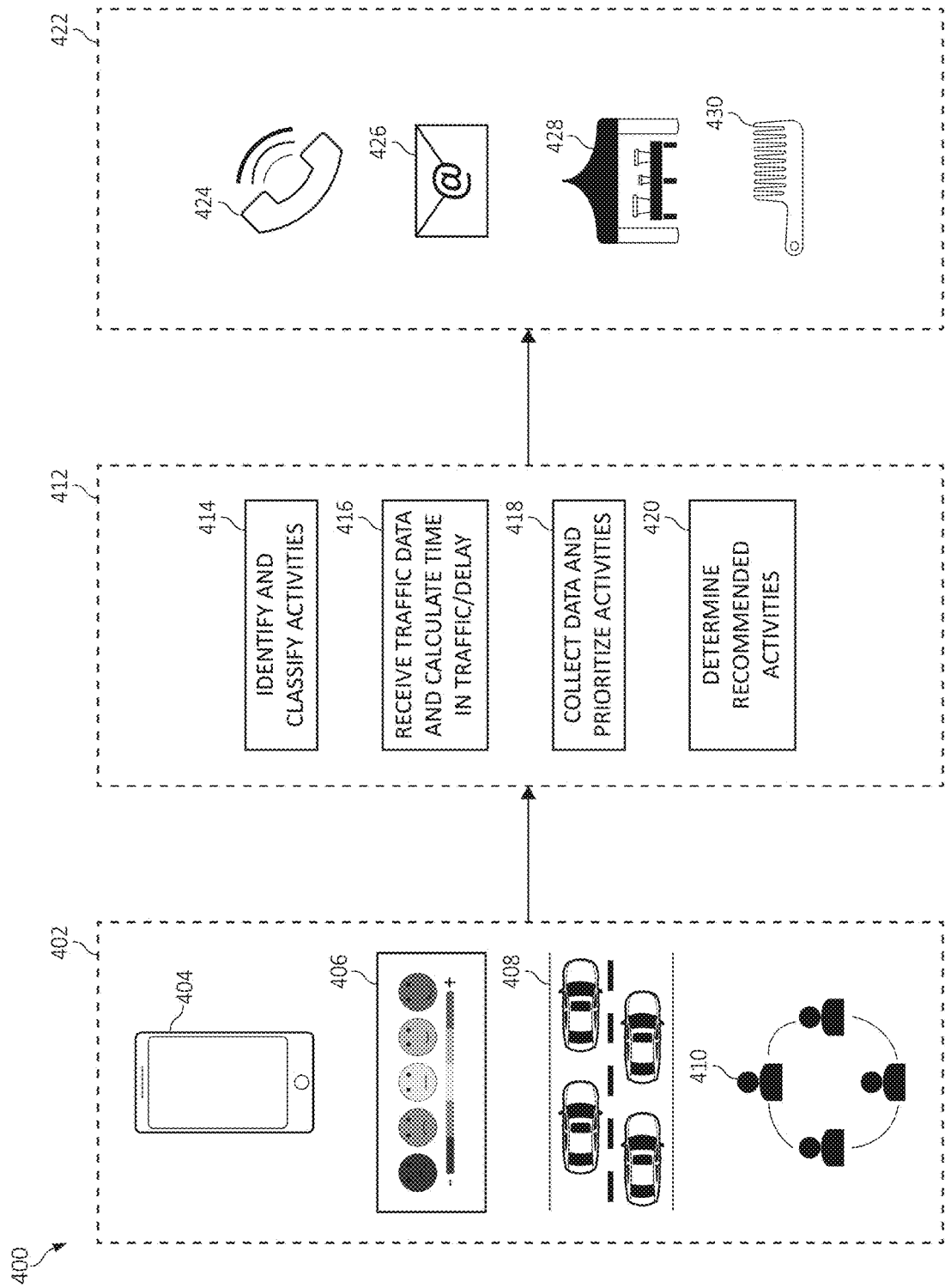
FIG. 4 is a block diagram of a system for generating activity recommendations according to an embodiment of the present invention.

FIG. 4 illustrates a system (and/or method) 400 for generating activity recommendations according to an embodiment of the present invention. It should be understood that the system 400 may be utilized to determine a recommended activity (and/or list of recommended activities) for individual users or multiple users (i.e., joint activities). The system 400 utilizes and/or includes inputs (or information sources) 402. In the example shown, the inputs 402 include one or more computing devices (e.g., a mobile electronic phone) 404, a cognitive state (or determined mood) 406, a traffic condition(s) 408, and social media activity 410, each of which may be associated with an individual user (e.g., an individual user onboard a vehicle with other users/individuals). The computing device 404 may be any suitable computing device associated with (or registered to) a user that may have various types of information associated with the user, such as a contact list, text messages, photographs, schedules, projects, etc. The cognitive state 406 may be determined utilizing various types of information, such as biometric sensors (e.g., in a wearable device, such as smart watch) and/or a camera/microphone (e.g., integrated into computing device 404) that is utilized to determine facial expressions and/or analyze spoken language. The traffic condition 408 may be received (or include) any suitable information source related to traffic conditions associated with a particular vehicle type or type of travel (e.g., traffic congestion, construction, etc. related to roads, roadways, etc. utilized by automobiles). Such information may be available through various online channels, navigation applications, etc., as will be appreciated by one skilled in the art. The social media activity 410 may include social media posts, reactions, comments, contacts, etc. related to an individual's social media account(s). Although four inputs 404-410 are shown in FIG. 4, it should be understood that other and/or additional inputs (or information sources) may be utilized in other embodiments.

Still referring to FIG. 4, within processing module 412, the system 400 utilizes the inputs 402 to generate a recommendation of one or more activities (or tasks) for a user(s) when in a vehicle, as described above. In particular, at block 414, (potential) activities and/or tasks (i.e., for a particular user) are identified and classified. The activities may be identified by analyzing the various information sources (e.g., schedules, "to-do" lists, electronic communications, etc.) associated with the inputs 402. This process may be performed utilizing, for example, linear regression. Examples of activities that are identified may include, for example, personal (or "non-work-related") activities (or tasks), such as paying bills, making personal phone calls, creating a shopping list, listening to music, etc, and work-related activities, such as work-related phone calls, sending/replying to emails or other electronic messages, etc.

At block 416, a particular traffic condition (or traffic data) is received or detected (e.g., while being monitored by the system). The traffic condition is analyzed to calculate an estimate time until the vehicle arrives at the destination (e.g., as entered into a navigation or mapping application, which may be accessible by and/or integrated with the system) and/or predict movements of the vehicle (e.g., including time(s) when the vehicle is stationary). This process may be performed utilizing a GPS system. Additionally, a classification method, such as a random forest algorithm, may be utilized in this process. In some embodiments, the activity recommendations are only generated if the vehicle is stationary and/or the vehicle is detected as moving less than a predetermined distance within a particular amount of time (or at least such is predicted to occur).

At block 418, additionally data may be collected, some of which may be utilized to prioritize activities. This process may include estimating how long (potentially) recommended activities may take for the user(s) to perform, along with monitoring the (current) activity and/or behavior of the user(s) (e.g., via facial data, biometric sensors, etc.).

At block 420, recommended activities are determined (or generated). As described above, the selection of the recommended activities may be based on various types of information, including the (current) destination of the vehicle, the estimated amount of time the user(s) have while in the vehicle, estimated to complete activities, etc.

Still referring to FIG. 4, the recommended activities are then provided to the user(s) via a rendering device (e.g., display screen) 422. For example, the recommended activities may be rendered on a display screen of a vehicular computing system, a mobile electronic device, or any other suitable system. In the example shown, the recommended activities include making a phone call 424, sending an email(s) 426, making a stop (e.g., stopping the vehicle at a suitable "rest stop" location, such as a coffee shop, etc.) 428, and performing personal grooming (e.g., brushing hair, brushing teeth, checking makeup, etc.) 430. However, it should be understood that these recommended activities are merely intended as examples. In some embodiments, the recommended activities are provided in a "ranked" list (e.g., with the higher priority/more highly recommended being listed first/at the top of the list).

Figure 5:
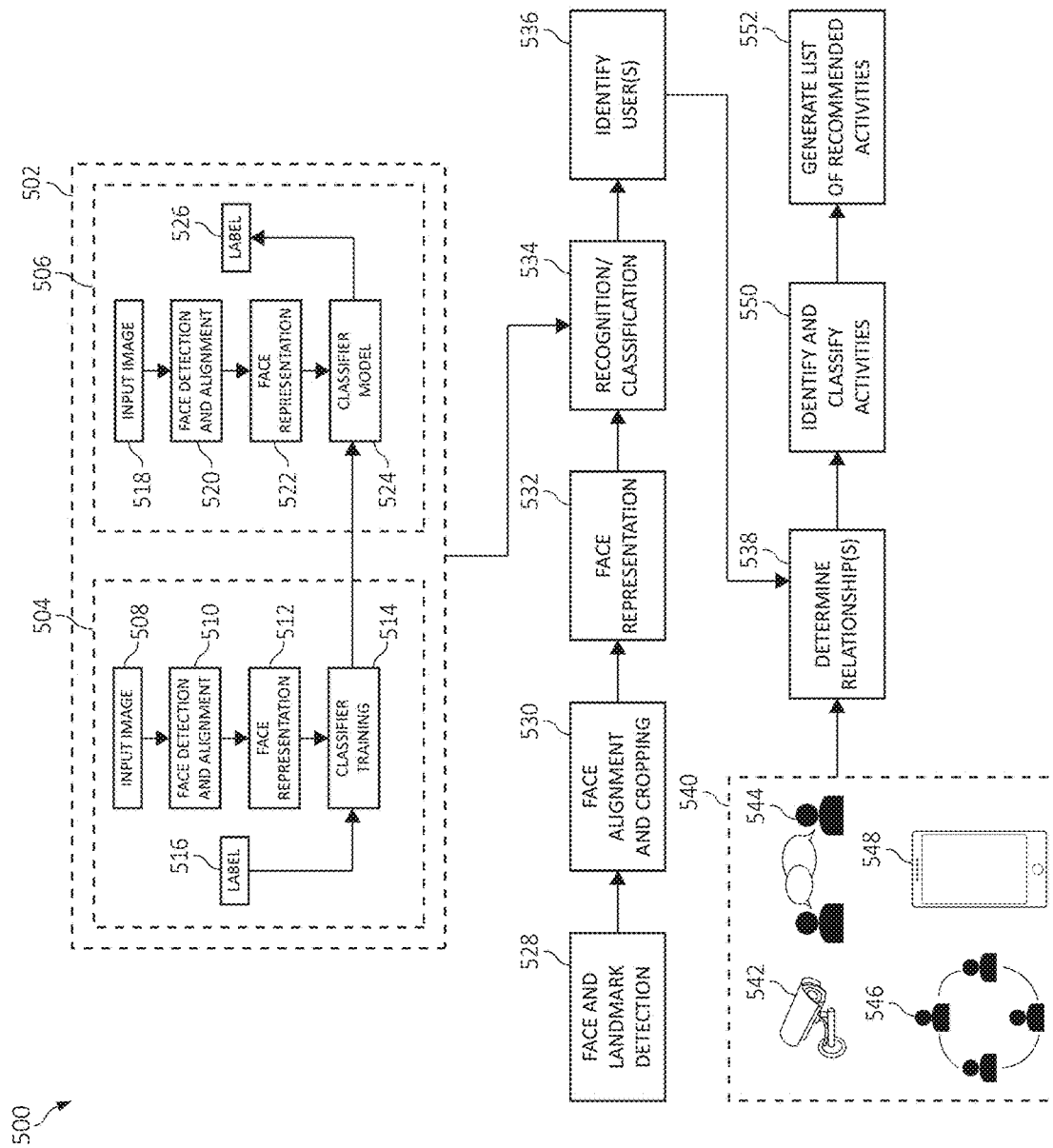
FIG. 5 is a block diagram of a system for generating activity recommendations according to an embodiment of the present invention.

FIG. 5 illustrates a system 500 for generating recommendations for activities according to some embodiments described herein. The system 500 may be implemented utilizing any suitable computing device associated with (or positioned within) a vehicle, such as a vehicular computing system, mobile electronic device, etc. In the example shown, the system 500 includes (or utilizes) a facial recognition model 502. As such, it should be understood that the system 500 may include (and/or utilize) one or more cameras (e.g., integrated into the vehicle or a mobile device).

The facial recognition model 502 includes (or utilizes) a training system (or process) 504, which receives an input image (or training image) 508, performs a face detection and alignment process 510, and generates a face representation (e.g., a mathematical representation of the face) 512. The face representation, along with a label (e.g., an identification of an individual) 516, is provided to a classifier training module 514, the output of which is provided to a classification system (or process) 506. This training may be performed multiple times (i.e., for multiple individuals and/or multiple images of the same individual).

The classification system 506 receives an input image 518, which may be captured by a camera within the vehicle (e.g., an image of the face of individual onboard the vehicle). The classification system 506 performs a face detection and alignment process 520 on the input image 518 and then generates a face representation 522. The face representation is provided to a classifier model (or module) 524 that compares it to the output of the classifier training module 514 and generates a label 526 (e.g., an identification of an individual). This process may be performed multiple times (i.e., for multiple individuals and/or multiple images of the same individual), as may the entire process performed by the system 500 (i.e., for multiple individuals onboard a vehicle). The facial recognition model 502 (and/or the output thereof) may be utilized by the system 500 as described below.

Still referring to FIG. 5, at block 528, a face and landmark detection process is performed to an image of an individual (or face thereof) onboard a vehicle. At block 530, a face alignment and cropping process is performed, and the output thereof is provided to block 532, which generates a face representation. The face representation is provided to block 534 where a facial recognition/classification process is performed, utilizing the facial recognition model 502 described above. The output thereof is utilized to identify a user(s) (or determine the identity thereof) at block 536. At block 538, one or more relationships between the individuals onboard the vehicle are determined (i.e., assuming there are multiple individuals onboard the vehicle). The process (along with other processes described herein) may utilize various information sources 540. In the example shown, the information sources 540 include one or more sensors (e.g., a camera and/or microphone) 542, the content of face-to-face conversations 544, social media information 546, and one or more mobile electronic devices (e.g., content thereon, such as a contact list) 548. Available information sources are then utilized to identify and classify activities (as described above) at block 550, and then generate a list of recommend activities at block 552.

In some embodiments, the recommended activities include "joint" activities that may be performed by (or are customized for) multiple individuals (e.g., a first user and a second user) onboard the vehicle. In some embodiments, if a recommended joint activity is determined to be not applicable to one or more individuals (e.g., a third user) onboard the vehicle, a different activity (or a different list of activities) may be generated for those individuals and provided thereto.

Figure 6:
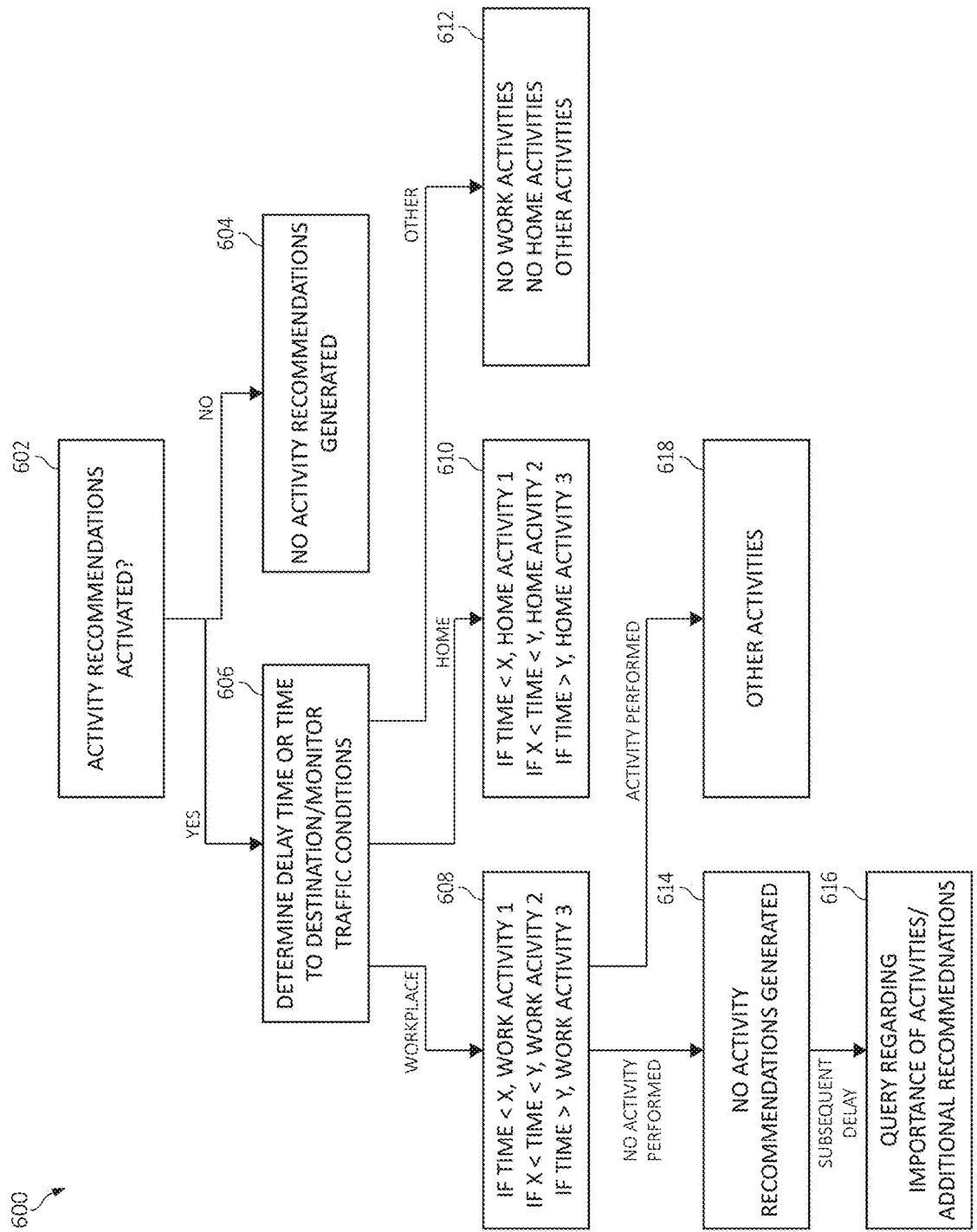
FIG. 6 is a block diagram of a method for generating activity recommendations according to an embodiment of the present invention.

FIG. 6 illustrates a method 600 for generating activity recommendation, in a decision tree-type manner, according to some embodiments described herein. The method 600 may be performed by any suitable computing device(s) described herein, such as those onboard and/or integrated into a vehicle (e.g., an automobile). At block 602, if the activity recommendation functionality is not activated (e.g., a user-configurable option), the method 600 proceeds to block 604 and no activity recommendations are generated. If such functionality is activated, at block 606, the appropriate information source(s) (e.g., traffic feeds, destination as input into a navigation application, etc.) are utilized to determine the length of the delay, time to destination, and/or monitor traffic conditions. As shown, at blocks 608, 610, and 612, different activities are recommended based on the destination. Additionally, as shown within blocks 608 and 610, different activities (e.g., work-related or home-related) are recommended (and/or prioritized) based on the estimated time/delay.

Still referring to FIG. 6 (and assuming the destination is workplace of the user(s)), if none of the recommended activities are performed by the user(s) (e.g., as detected utilizing a camera, monitoring various devices, etc.), at block 614, no additional recommendations are generated. However, in the depicted embodiment, if an additional delay in traffic occurs and/or is predicted, the system may perform additional steps, such as querying the user(s) regarding the importance of particular activities, generated additional recommendations, reminding the user(s) of the previous generated recommendations, etc. In the example shown, if one or more of the recommended activities (or perhaps any other activity) is performed by the user(s), at block 618, additional recommendations may be generated (e.g., given time constraints, current traffic conditions, etc.).

Figure 7:
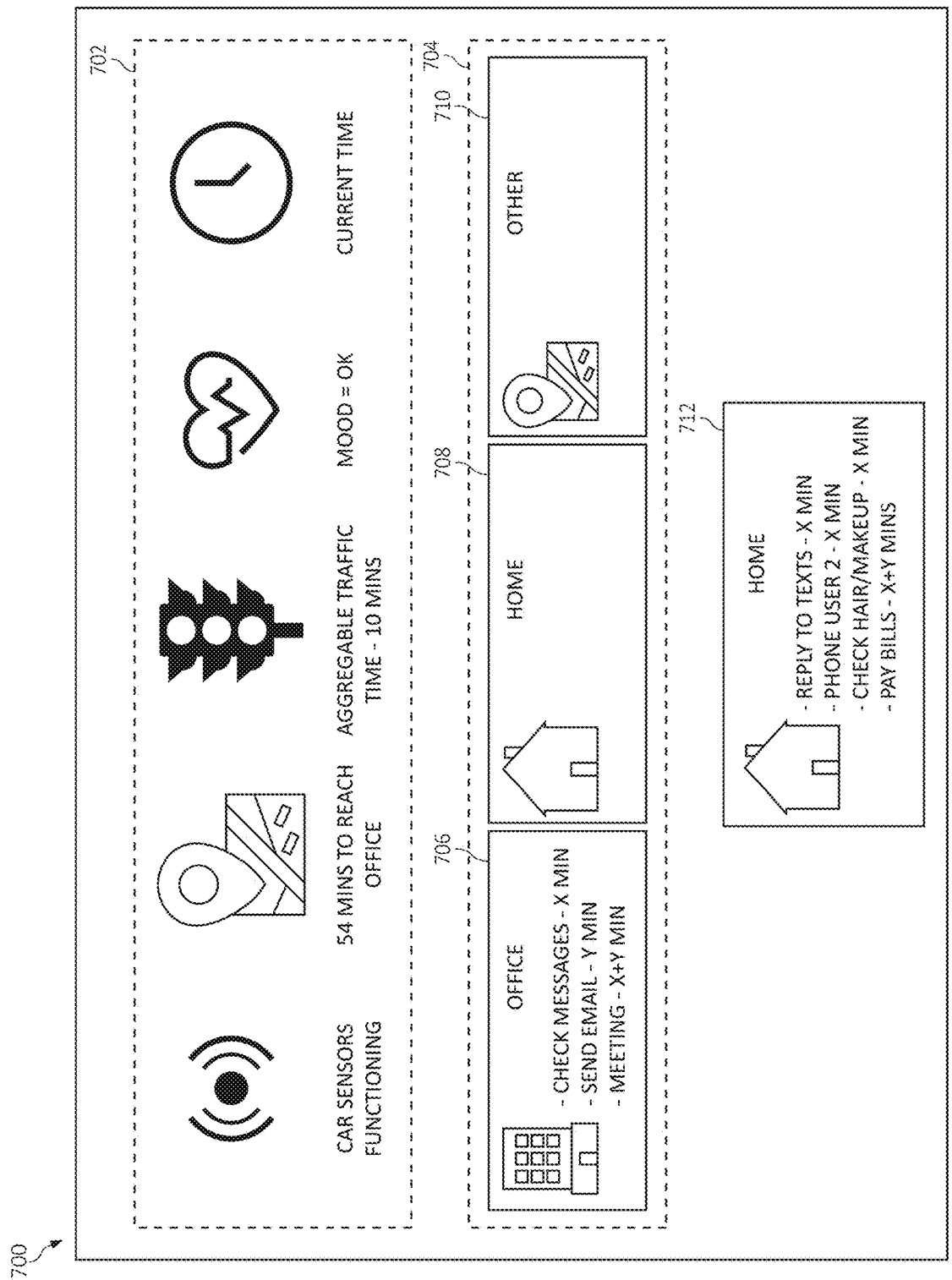
FIG. 7 is a plan view of a graphical user interface according to an embodiment of the present invention.

Referring now to FIG. 7, an exemplary "dashboard" (or graphical user interface (GUI)) 700, which may be utilized by the systems and methods described herein, is shown. That is, the dashboard 700 is shown as it may be rendered on a display screen of a computing device (e.g., a vehicular computing system, a mobile electronic device, etc.). In the example shown, the dashboard 700 include a basic information portion 702, which may be utilized to display various type of (current/updated) information, such as the status of sensors, time to destination, aggregable traffic time, the current detected cognitive state of the user(s), the current time, etc. The aggregable time may refer to the estimated amount of time the user(s) has to perform an activity (e.g., the amount of time the vehicle is expected to be stuck in traffic).

Still referring to FIG. 7, the dashboard also include a primary recommendation portion 704, which includes individual sections (or "buttons") 706, 708, and 710, each of which is associated with work-related (or "office"), home, and other activities, respectively. In the example shown, recommended activities (e.g., "check messages," "send email," and "meeting") are only shown in the office section 706 of the primary recommendation portion 704. As such, it may be assumed that the current destination is the workplace of the user(s), and as such, recommended activities associated with the workplace or occupation of the user(s) have been generated and provided to the user(s) as "prioritized" recommended activities.

However, in some embodiments, other recommendations may also be generated, even if not initially provided to the user(s). For example, as shown in FIG. 7, a secondary recommendation portion 712 is shown below the home section 708. In some embodiments, such secondary or non-prioritized recommendations may be shown based on user feedback or input (e.g., the user touching or pressing the home section 708 if the display device is a touchscreen or via any other suitable means). For example, if the user(s) is traveling to their workplace but decides to utilize any extra time to perform activities related to their home, they may select to receive such activity recommendations by actuating the home button 708.

As such, in some embodiments, systems and/or methods are provided that determine or receive various types of information about users (e.g., individuals, drivers, passengers, etc.) onboard vehicles, determine any relationships between the users, and provide recommendations of activities that may be performed while onboard the vehicle.

In some embodiments, the system first determines how many individuals are onboard the vehicle, and if there are more than one, identify any relationship(s) between them. Various activities are identified and classified based on various types of information associated with the users. Activities may be classified based on the number of users, their ages, the time of day, the destination of the vehicle, etc. The activities may be classified for multiple users based on a preferential ranking (e.g., utilizing a decision tree).

The identification of relationships may be performed utilizing, for example, facial recognition and mapping of contacts (e.g., via social media, email/phone contacts, etc.). IOT devices (e.g., sensors, cameras, etc.) may be utilized to determine the number of individuals onboard the vehicle and determine their identities. Training and classification models may be implemented that utilize image cropping, face representations, etc. Faces may be mapped via social media activity and mobile contacts. Relationships may be determined based on the "tagging" of items (e.g., on social media, such as "family," "friend," "significant other," etc.). If a specific relationship type may be determined, the relationship may be specifically marked as such. If not, a generic "acquaintance" (or similar) label may be utilized. In some embodiments, if a relationship between users can not be determined, a warning of such may be provided to one or more of the users (e.g., to prevent sensitivity information from being disseminated to unwanted individuals).

Figure 8:
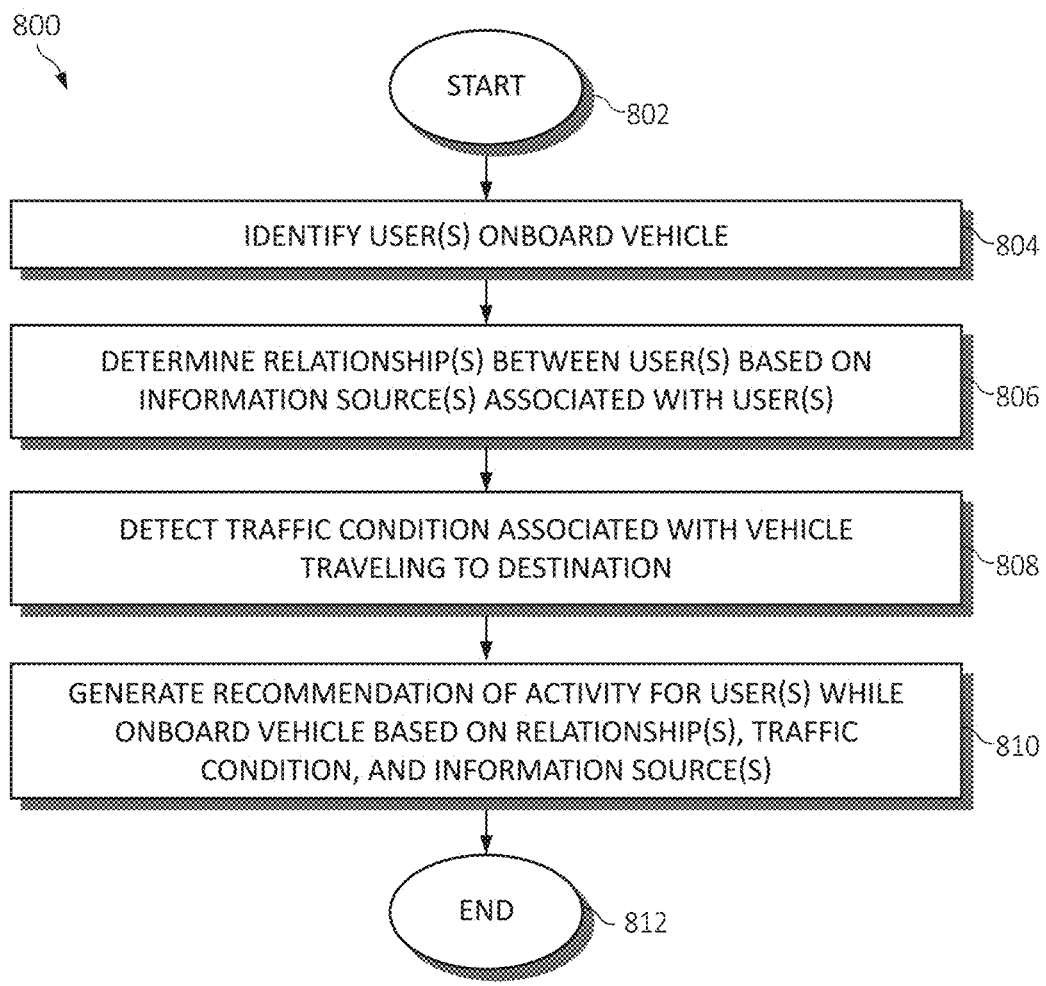
FIG. 8 is a flowchart diagram of an exemplary method for generating recommendations for user activity onboard a vehicle according to an embodiment of the present invention.

Turning to FIG. 8, a flowchart diagram of an exemplary method 800 for generating recommendations for user activity when onboard a vehicle is provided. The method 800 begins (step 802) with, for example, the system (such as that described herein) being provided with access to various types of information sources associated with users (or individuals) and being implemented with one or more suitable computing devices, such as those described above.

One or more users onboard a vehicle are identified (step 804). In particular, in some embodiments, a first user and a second user onboard the vehicle are identified.

One or more relationships between the user(s) are determined based on one or more information sources associated with the user(s) (step 806). In particular, in some embodiments, a relationship between the first user and the second user is determined based on at least one information source associated with at least one of the first user and the second user. The at least one information source may include at least one of sensor information, a contact list, a schedule, and social media information. At least one of the identifying of the first user and the second user and the determining of the relationship between the first user and the second user may be performed utilizing at least one of a camera and the presence of computing devices onboard the vehicle.

A traffic condition associated with the vehicle traveling to a destination is detected (step 808). The detected traffic condition associated with the vehicle traveling to the destination may include at least one of an estimated time for the vehicle to arrive at the destination and predicted movements of the vehicle as the vehicle travels to the destination.

A recommendation of an activity (or recommended list of activities) for the user(s) while onboard the vehicle is generated based on the determined relationship(s), the traffic condition, and the information sources (step 810). In particular, in some embodiments, a recommendation of an joint activity for the first user and the second user while onboard the vehicle is generated based on the determined relationship between the first user and the second user, the detected traffic condition, and the at least one information source. The generating of the recommendation of the joint activity for the first user and the second user may include generating a list of a plurality of recommended joint activities for the first user and the second user and providing the list of the plurality of recommended joint activities utilizing a computing device onboard the vehicle. If the destination is a first destination, the recommended joint activity may include a first joint activity. If the destination is a second destination, the recommended joint activity may include a second joint activity.

In some embodiments, a third user onboard the vehicle may be identified. A relationship between the third user and at least one of first user and the second user may be determined. A recommendation of an activity for the third user may be generated based on the detected traffic condition, the determined relationship between the third user and the at least one of the first user and the second user, and at least one information source associated with the third user. The recommended activity for the third user may be different than the recommended joint activity for the first user and the second user.

Method 800 ends (step 812) with, for example, one or more of the recommended activities being performed by one or more user onboard the vehicle. In some embodiments, feedback from users may also be utilized to improve the performance of the system over time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for generating recommendations for user activity onboard a vehicle, by a processor, comprising:
   identifying a first user and a second user onboard a vehicle;
   determining a relationship between the first user and the second user based on at least one information source associated with at least one of the first user and the second user;
   detecting a traffic condition associated with the vehicle traveling to a destination; and
   generating a recommendation of a joint activity for the first user and the second user while onboard the vehicle based on the determined relationship between the first user and the second user, the detected traffic condition, and the at least one information source.

2. The method of claim 1, wherein the detected traffic condition associated with the vehicle traveling to the destination includes at least one of an estimated time for the vehicle to arrive at the destination and predicted movements of the vehicle as the vehicle travels to the destination.

3. The method of claim 1, wherein the at least one information source includes at least one of sensor information, a contact list, a schedule, and social media information.

4. The method of claim 1, wherein at least one of the identifying of the first user and the second user and the determining of the relationship between the first user and the second user is performed utilizing at least one of a camera and the presence of computing devices onboard the vehicle.

5. The method of claim 1, wherein the generating of the recommendation of the joint activity for the first user and the second user includes:
   generating a list of a plurality of recommended joint activities for the first user and the second user; and
   providing the list of the plurality of recommended joint activities utilizing a computing device onboard the vehicle.

6. The method of claim 1, wherein if the destination is a first destination, said recommended joint activity includes a first joint activity, and if the destination is a second destination, said recommended joint activity includes a second joint activity.

7. The method of claim 1, further comprising:
   identifying a third user onboard the vehicle;
   determining a relationship between the third user and at least one of first user and the second user; and
   generating a recommendation of an activity for the third user based on the detected traffic condition, the determined relationship between the third user and the at least one of the first user and the second user, and at least one information source associated with the third user,
   wherein said recommended activity for the third user is different than said recommended joint activity for the first user and the second user.

8. A system for generating recommendations for user activity onboard a vehicle comprising:
   a processor executing instructions stored in a memory device, wherein the processor:
   identifies a first user and a second user onboard a vehicle;
   determines a relationship between the first user and the second user based on at least one information source associated with at least one of the first user and the second user;
   detects a traffic condition associated with the vehicle traveling to a destination; and
   generates a recommendation of a joint activity for the first user and the second user while onboard the vehicle based on the determined relationship between the first user and the second user, the detected traffic condition, and the at least one information source.

9. The system of claim 8, wherein the detected traffic condition associated with the vehicle traveling to the destination includes at least one of an estimated time for the vehicle to arrive at the destination and predicted movements of the vehicle as the vehicle travels to the destination.

10. The system of claim 8, wherein the at least one information source includes at least one of sensor information, a contact list, a schedule, and social media information.

11. The system of claim 8, wherein at least one of the identifying of the first user and the second user and the determining of the relationship between the first user and the second user is performed utilizing at least one of a camera and the presence of computing devices onboard the vehicle.

12. The system of claim 8, wherein the generating of the recommendation of the joint activity for the first user and the second user includes:
   generating a list of a plurality of recommended joint activities for the first user and the second user; and
   providing the list of the plurality of recommended joint activities utilizing a computing device onboard the vehicle.

13. The system of claim 8, wherein if the destination is a first destination, said recommended joint activity includes a first joint activity, and if the destination is a second destination, said recommended joint activity includes a second joint activity.

14. The system of claim 8, wherein the processor further:
   identifies a third user onboard the vehicle;
   determines a relationship between the third user and at least one of first user and the second user; and generates a recommendation of an activity for the third user based on the detected traffic condition, the determined relationship between the third user and the at least one of the first user and the second user, and at least one information source associated with the third user, wherein said recommended activity for the third user is different than said recommended joint activity for the first user and the second user.

15. A computer program product for generating recommendations for user activity onboard a vehicle, by a processor, the computer program product embodied on a non-transitory computer-readable storage medium having computer-readable program code portions stored therein, the computer-readable program code portions comprising:

an executable portion that identifies a first user and a second user onboard a vehicle;

an executable portion that determines a relationship between the first user and the second user based on at least one information source associated with at least one of the first user and the second user;

an executable portion that detects a traffic condition associated with the vehicle traveling to a destination; and an executable portion that generates a recommendation of a joint activity for the first user and the second user while onboard the vehicle based on the determined relationship between the first user and the second user, the detected traffic condition, and the at least one information source.

16. The computer program product of claim 15, wherein the detected traffic condition associated with the vehicle traveling to the destination includes at least one of an estimated time for the vehicle to arrive at the destination and predicted movements of the vehicle as the vehicle travels to the destination.

17. The computer program product of claim 15, wherein the at least one information source includes at least one of sensor information, a contact list, a schedule, and social media information.

18. The computer program product of claim 15, wherein at least one of the identifying of the first user and the second user and the determining of the relationship between the first user and the second user is performed utilizing at least one of a camera and the presence of computing devices onboard the vehicle.

19. The computer program product of claim 15, wherein the generating of the recommendation of the joint activity for the first user and the second user includes:

generating a list of a plurality of recommended joint activities for the first user and the second user; and providing the list of the plurality of recommended joint activities utilizing a computing device onboard the vehicle.

20. The computer program product of claim 15, wherein if the destination is a first destination, said recommended joint activity includes a first joint activity, and if the destination is a second destination, said recommended joint activity includes a second joint activity.

21. The computer program product of claim 15, wherein the computer-readable program code portions further include:

an executable portion that identifies a third user onboard the vehicle;

an executable portion that determines a relationship between the third user and at least one of first user and the second user; and an executable portion that generates a recommendation of an activity for the third user based on the detected traffic condition, the determined relationship between the third user and the at least one of the first user and the second user, and at least one information source associated with the third user, wherein said recommended activity for the third user is different than said recommended joint activity for the first user and the second user.

* * * * *